(12) United States Patent
Wu

(10) Patent No.: US 12,432,325 B2
(45) Date of Patent: Sep. 30, 2025

(54) PROJECTION SYSTEM AND CONTROL METHOD THEREOF

(71) Applicant: Coretronic Corporation, Hsin-Chu (TW)

(72) Inventor: Po-Yen Wu, Hsin-chu (TW)

(73) Assignee: Coretronic Corporation, Hsin-Chu (TW)

( * ) Notice: Subject to any disclaimer, the term of this patent is extended or adjusted under 35 U.S.C. 154(b) by 560 days.

(21) Appl. No.: 17/969,672

(22) Filed: Oct. 19, 2022

(65) Prior Publication Data
US 2023/0140198 A1 May 4, 2023

(30) Foreign Application Priority Data

Oct. 29, 2021 (CN) .......................... 202111267675.9

(51) Int. Cl.
*H04N 9/31* (2006.01)

(52) U.S. Cl.
CPC ................................. *H04N 9/3194* (2013.01)

(58) Field of Classification Search
CPC .. H04N 9/3129; H04N 9/3179; H04N 9/3185; H04N 9/3194; H04N 21/4122; H04N 21/42202; H04N 21/42214; G03B 21/14; G03B 21/147
See application file for complete search history.

(56) References Cited

U.S. PATENT DOCUMENTS

| 2009/0147224 | A1  | 6/2009  | Kurozuka et al. |
| 2016/0234468 | A1* | 8/2016  | Hu ........................ G03B 21/26 |
| 2018/0075821 | A1* | 3/2018  | Ano .................... G06F 3/03542 |
| 2021/0389458 | A1* | 12/2021 | Ohnaka .................. G01S 7/484 |

FOREIGN PATENT DOCUMENTS

| CN | 104598034 | 5/2015 |
| CN | 212677309 | 3/2021 |
| JP | 2006078761 | 3/2006 |
| TW | M292226 | 6/2006 |
| TW | M464707 | 11/2013 |

OTHER PUBLICATIONS

"Office Action of China Counterpart Application", issued on Sep. 28 2024, p. 1-p. 6.

* cited by examiner

*Primary Examiner* — Sultan Chowdhury
(74) *Attorney, Agent, or Firm* — JCIPRNET

(57) ABSTRACT

A projection system and control method thereof are provided. A player apparatus generates and transmits an image signal to a projection apparatus, and a plurality of first distance values within a first time are received through a distance sensor. An average value of the plurality of first distance values is calculated and set as a reference value. During a playback of the image signal, an average value of a plurality of second distance values received from the distance sensor is calculated every second time to serve as a first-stage detection value. When the first-stage detection value is less than the reference value, the image signal is paused.

14 Claims, 4 Drawing Sheets

PROJECTION SYSTEM AND CONTROL METHOD THEREOF

CROSS-REFERENCE TO RELATED APPLICATION

This application claims the priority benefit of China application serial no. 202111267675.9 filed on Oct. 29, 2021. The entirety of the above-mentioned patent application is hereby incorporated by reference herein and made a part of this specification.

BACKGROUND

Technical Field

The invention relates to a control mechanism for audio and video playback, and particularly relates to a projection system and a control method thereof.

Description of Related Art

Projector used in business, home setting, or education have been innovated extensively. More and more consumers choose projectors for viewing films. However, in general, when viewing a film, if someone or an obstacle passes by from the front, a consumer may only pause the film by pressing "pause" on a remote control or by directly pressing "pause" in a playback source, or wait for the obstacle to move away and press "rewind" to resume the missed part of the film, which is very inconvenient in use.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The invention is directed to a projection system and a control method thereof, which are adapted to automatically pause playback of image signals when an obstacle appears on a projection path.

Other objects and advantages of the invention may be further illustrated by the technical features broadly embodied and described as follows.

In order to achieve one or a portion of or all of the objects or other objects, an embodiment of the invention provides a control method of a projection system, including: generating an image signal and transmitting the image signal to a projection apparatus through a player apparatus; receiving a plurality of first distance values within a first time through a distance sensor; calculating an average value of the plurality of first distance values and setting the average value as a reference value through a processor; calculating an average value of a plurality of second distance values received from the distance sensor every second time by the processor to serve as a first-stage detection value during a playback of the image signal; and pausing the image signal through the processor when the first-stage detection value is less than the reference value.

In an embodiment of the invention, the control method further includes: determining whether the projection apparatus is moved through a sensing value of a gravity sensor; and resetting the reference value in response to determining that the projection apparatus is moved.

In an embodiment of the invention, when the first-stage detection value is less than the reference value, the step of pausing the image signal through the processor includes: pausing the image signal through the processor when the first-stage detection value is less than a setting ratio of the reference value.

In an embodiment of the invention, when the first-stage detection value is less than the reference value, the step of pausing the image signal through the processor includes: pausing the image signal in response to that all of the first-stage detection values obtained within a specified time are less than the reference value, and the specified time is greater than the second time.

In an embodiment of the invention, when the first-stage detection value is less than the reference value, the step of pausing the image signal through the processor includes: pausing the image signal when detecting that a number of times that the first-stage detection value is less than the reference value reaches a specified number of times.

In an embodiment of the invention, the control method further includes: calculating an average value of a plurality of third distances received from the distance sensor every third time to serve as a second-stage detection value when pausing the image signal; and cancelling pausing and continuing to play the image signal when the second-stage detection value is within a reference range, wherein the reference range is set based on the reference value.

In an embodiment of the invention, the player apparatus is coupled to the projection apparatus. The control method further includes: transmitting a pause instruction through the processor to the player apparatus; and pausing playback of the image signal through the player apparatus in response to the pause instruction.

The invention provides a projection system including a player apparatus configured to generate an image signal; and a projection apparatus coupled to the player apparatus and configured to receive the image signal from the player apparatus. The projection apparatus includes: a distance sensor, which receives a plurality of first distance values within a first time; and a processor, which is coupled to the distance sensor, and configured to calculate an average value of the plurality of first distance values for setting as a reference value, and calculate an average value of a plurality of second distances received from the distance sensor every second time to serve as a first-stage detection value during a playback of the image signal. When the first-stage detection value is less than the reference value, the processor controls the player apparatus to pause playback of the image signal.

Based on the above description, the invention uses a distance sensor to detect a distance to a projection plane, so that when an obstacle appears on the projection path, playback of the image signal may be automatically paused, thereby improving a visual experience.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

It is to be understood that other embodiment may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "left," "right," "front," "back," etc., is used with reference to the orientation of the Figure(s) being described and are not intended to be limiting of the invention.

Figure 1:
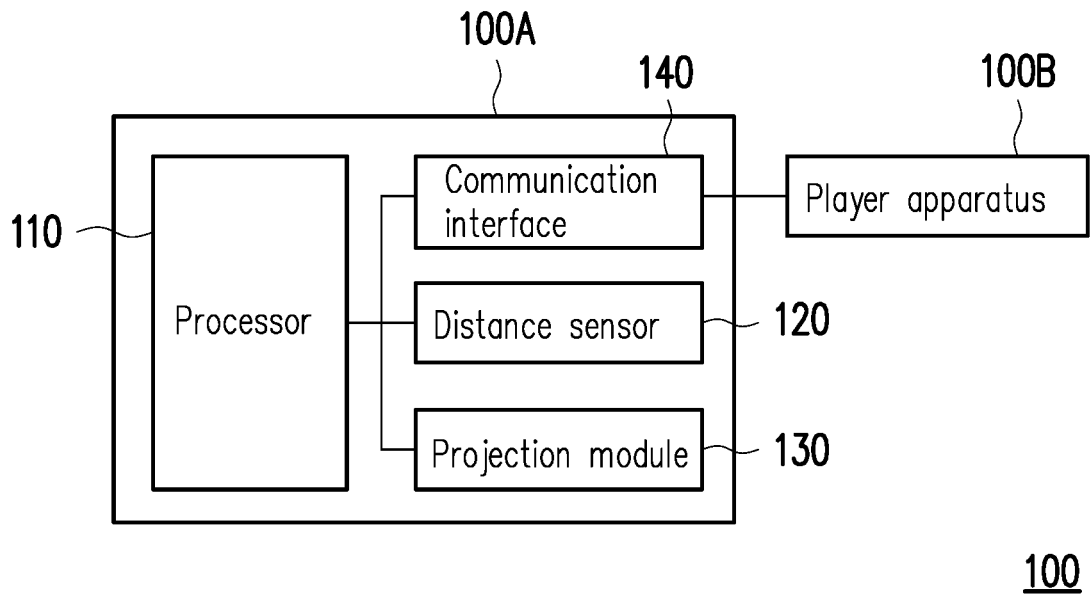
FIG. 1 is a block diagram of a projection system according to an embodiment of the invention.
Figure 2:
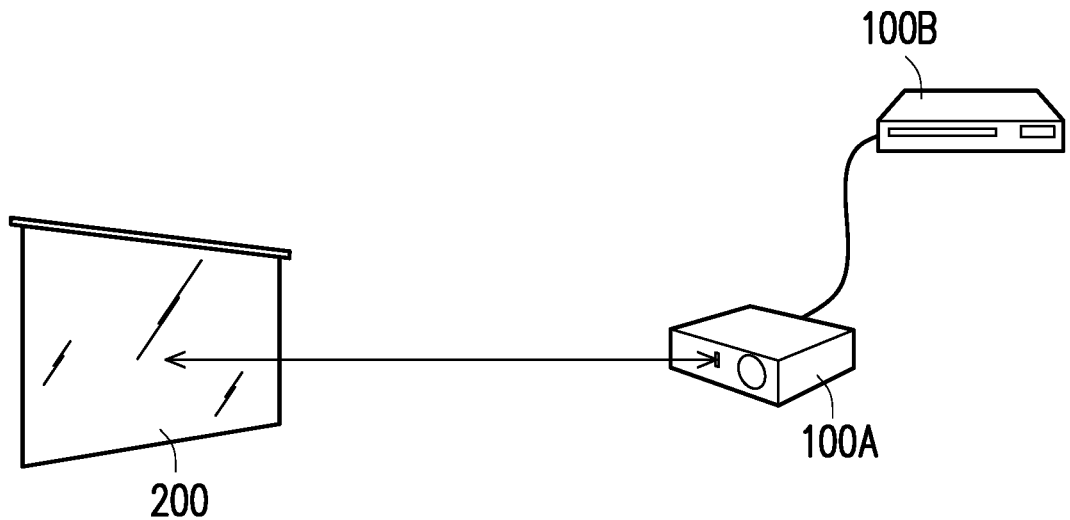
FIG. 2 is a schematic diagram of a projection system according to an embodiment of the invention.

FIG. 1 is a block diagram of a projection system according to an embodiment of the invention. FIG. 2 is a schematic diagram of a projection system according to an embodiment of the invention. Referring to FIG. 1 and FIG. 2, a projection system 100 includes a projection apparatus 100A and a player apparatus 100B. The player apparatus 100B is coupled to the projection apparatus 100A. The player apparatus 100B is, for example, a personal computer, a notebook computer, a tablet computer, a smart phone, a video player, etc.

The projection apparatus 100A includes a processor 110, a distance sensor 120, a projection module 130, and a communication interface 140. The processor 110 is coupled to the distance sensor 120, the projection module 130 and the communication interface 140.

The processor 110 is, for example, a central processing unit (CPU), a graphics processing unit (GPU), or other programmable microprocessor, a digital signal processor (DSP), a programmable controller, an application specific integrated circuit (ASIC), a programmable logic device (PLD) or other similar devices.

The distance sensor 120 is, for example, a time of flight (ToF) sensor, for sensing a distance between the projection apparatus 100A and a projection plane 200. The projection module 130 includes a light source, an imaging element, a projection lens, etc., for implementing projection. The communication interface 140 is used for coupling to the player apparatus 100B. The communication interface 140 may be implemented by a physical transmission port or a connection chip. The connection chip may use communication technology protocols such as local area network (LAN), Wi-Fi, 4G, 5G, etc.

After the projection apparatus 100A is turned on, the distance sensor 120 continuously detects the distance to the projection plane 200. When an obstacle appears between the projection apparatus 100A and the projection plane 200, a pause playing mode is activated, and after the obstacle moves away, a playing mode is resumed. Embodiments are provided below for detailed description.

Figure 3:
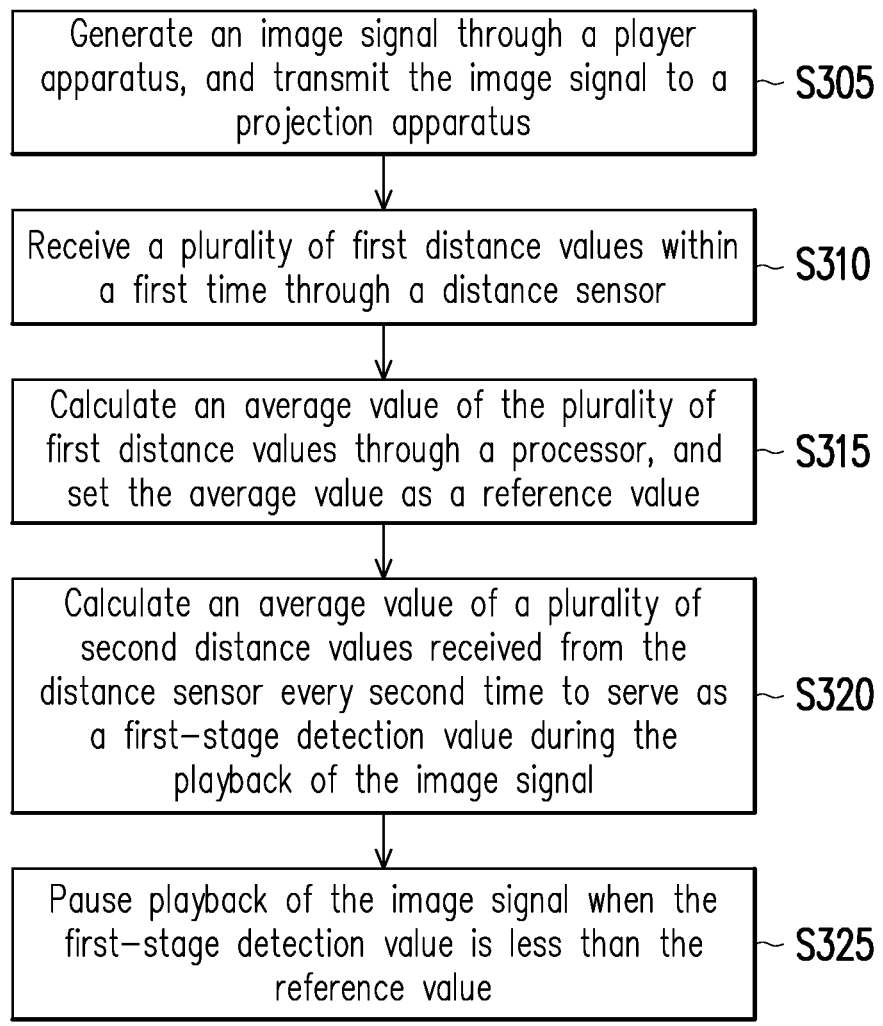
FIG. 3 is a flowchart of a control method of a projection system according to an embodiment of the invention.

FIG. 3 is a flowchart of a control method of a projection system according to an embodiment of the invention. Referring to FIG. 1 to FIG. 3 at the same time, in step S305, an image signal is generated through the player apparatus 100B and transmitted to the projection apparatus 100A. After receiving the image signal, the projection apparatus 100A projects an image onto the projection plane 200 through the projection module 130.

In step S310, a plurality of first distance values are received through the distance sensor 120 within a first time. In the embodiment, it may be set that the projection apparatus 100A immediately activates the distance sensor 120 to perform distance sensing after receiving the image signal, and the processor 110 may receive a plurality of first distance values from the distance sensor 120 within the first time. For example, it is assumed that a sampling time of the distance sensor 120 is 10 milliseconds (ms), and the first time is set to 100 ms, the processor 110 may obtain 10 batches of the first distance values from the distance sensor 120 within 100 ms.

Then, in step S315, the processor 110 calculates an average value of the plurality of first distance values for setting as a reference value. Since it is necessary to exclude drifting of the projection plane 200 (for example, a curtain) or a distance changing state before being erected to the target position, the processor 110 may further determine whether the received plurality of first distance values are stable values in step S315. For example, value ranges of these first distance values are all within a certain variation range, and if there is a first distance value with an abnormally high or low value, the processor 110 may further eliminate the first distance value with the abnormally high or low value, and calculate the average value of the remained first distance values.

Thereafter, in step S320, during a playback of the image signal, the processor 110 calculates an average value of a plurality of second distance values received from the distance sensor 120 every second time to serve as a first-stage detection value. The second time may be the same as or different from the first time. For example, it is assumed that the sampling time of the distance sensor 120 is 10 ms, and the second time is set to 100 ms, and the number of times for obtaining the second distance values is 10 times, the processor 110 receives 10 batches of the second distance values from the distance sensor 120 every 100 ms, and uses an average value of the 10 batches of the second distance values as the first-stage detection value. Here, the number of times for obtaining the second distance values is not limited.

Then, in step S325, when the first-stage detection value is less than the reference value, the processor 110 pauses playback of the image signal. To be specific, when there is an obstacle between the projection apparatus 100A and the projection plane 200, the first-stage detection value may be smaller than the reference value. In this case, a user's viewing effect is affected, and therefore, the processor 110 may pause playback of the image signal. For example, the processor 110 may send a pause instruction to the player apparatus 100B, and the player apparatus 100B pauses playback of the image signal in response to the pause instruction.

In an embodiment, the player apparatus 100B is externally connected to the projection apparatus 100A. The projection apparatus 100A adopts a high definition multimedia interface (HDMI) to implement the communication interface 140, and is externally connected to the player apparatus 100B through the communication interface 140. The processor 110 of the projection apparatus 100A may transmit the pause instruction to the player apparatus 100B via a consumer electronics control (CEC) protocol, so that the player apparatus 100B pauses playback of the image signal.

In another embodiment, the player apparatus 100B is built in the projection apparatus 100A, and the communication interface 140 is an interface for internal signal transmission. The processor 110 may directly transmit the pause instruction to the player apparatus 100B via the internal communication interface 140 without using the CEC protocol.

Figure 4:
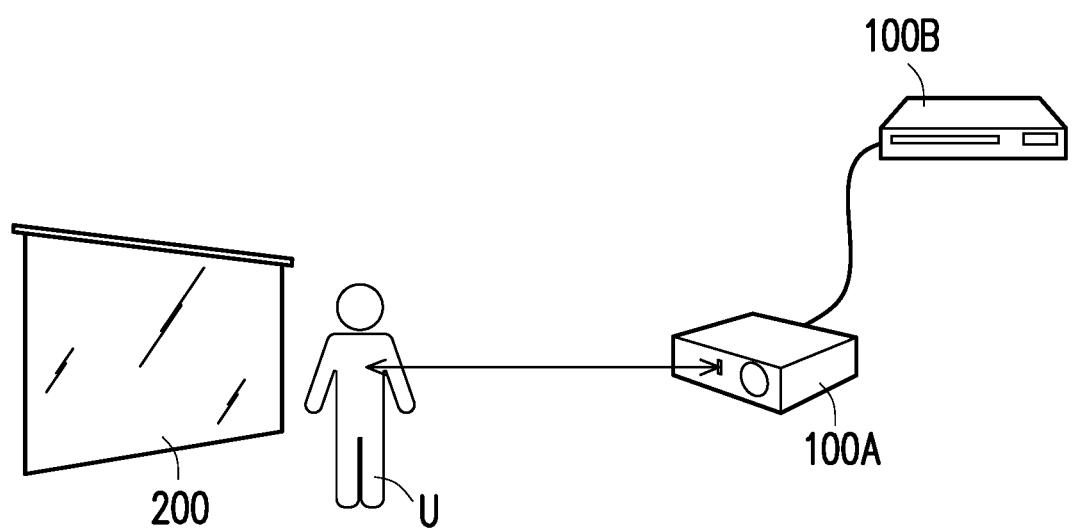
FIG. 4 is a schematic diagram of an obstacle appeared in a projection path according to an embodiment of the invention.

FIG. 4 is a schematic diagram of an obstacle appeared in a projection path according to an embodiment of the invention. Referring to FIG. 4, an obstacle, such as a user U, suddenly appears between the projection apparatus 100A and the projection plane 200. In the example shown in FIG. 4, when the user U appears between the projection apparatus 100A and the projection plane 200, the distance (the first-stage detection value) detected by the distance sensor 120 may be smaller than the reference value.

In order to avoid misjudgment of obstacles, one of the following three settings may be further set. Setting 1: when the first-stage detection value is less than a setting ratio of the reference value, the processor 110 pauses playback of the image signal. For example, it is assumed that the reference value is 3 meters, and the set ratio is 90% of the reference value, if the first-stage detection value is 2 meters (which is less than 2.7 meters), the playback of the image signal is paused.

Setting 2: the processor 110 pauses playback of the image signal in response to that all of the first-stage detection values obtained within a specified time (which is greater than the second time) are less than the reference value. Namely, it has to maintain for the specified time that the first-stage detection values obtained continuously are all less than the reference value before pausing playback of the image signal. For example, it is assumed that the specified time is 2 seconds, and the second time is 100 ms. Namely, the first-stage detection value is calculated every 100 ms. After detecting that the first-stage detection value is less than the reference value, 20 batches of first-stage detection values obtained continuously within 2 seconds must be all less than the reference value before pausing playback of the image signal.

Setting 3: when it is detected that a number of times that the first-stage detection value is less than the reference value reaches a specified number of times, the processor 110 pauses playback of the image signal. Namely, the number of times that the continuously obtained first-stage detection values are all less than the reference value must be maintained for a specified number of times before pausing playback of the image signal. For example, if the specified number of times is 10, it means that it is required 10 consecutive times for the obtained first-stage detection values being all less than the reference value before pausing playback of the image signal.

After playback of the image signal is paused, the playing may be continued after the obstacle moves away, and another example is given below for description.

Figure 5:
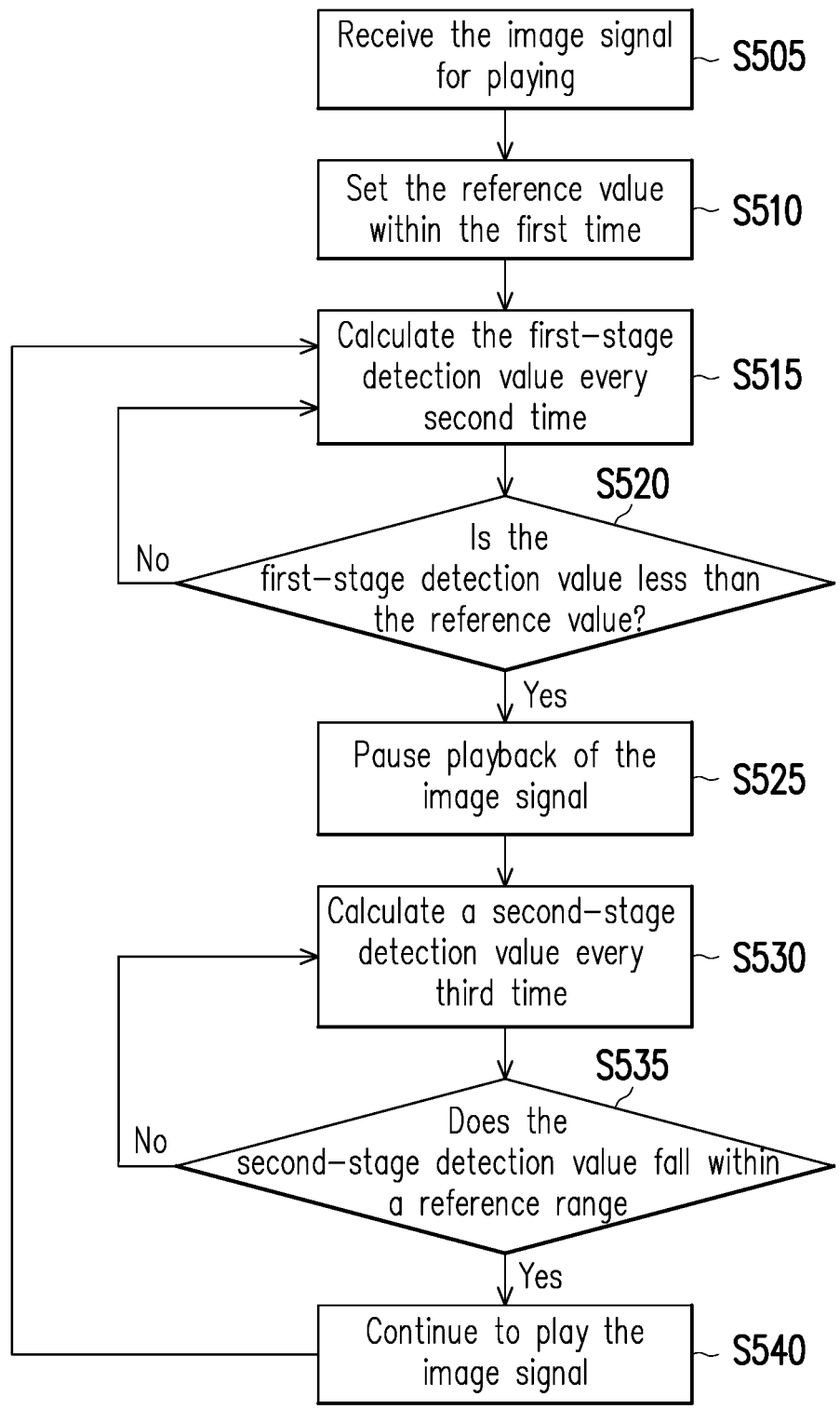
FIG. 5 is a flowchart of an image signal control method of a projection system according to an embodiment of the invention.

FIG. 5 is a flowchart of an image signal control method of a projection system according to an embodiment of the invention. The embodiment shown in FIG. 5 is one of application examples of the embodiment of FIG. 3. Referring to FIG. 1 and FIG. 5, in step S505, the processor 110 receives the image signal for playing.

In step S510, the processor 110 sets the reference value within the first time. Referring to the aforementioned step S310 and step S315 for a detailed description of step S510. Then, in step S515, the first-stage detection value is calculated every second time. Referring to the aforementioned step S320 for a detailed description of step S515

Thereafter, in step S520, the processor 110 determines whether the first-stage detection value is less than the reference value. When the first-stage detection value is less than the reference value, in step S525, the processor 110 pauses playback of the image signal. When the first-stage detection value is not less than the reference value, the flow returns to step S515 to continue to play the image signal. In other words, during the period of playing the image signal, step S515 is continuously executed.

For example, it may be set as that when the first-stage detection value is less than the setting ratio of the reference value, the processor 110 pauses playback of the image signal. Alternatively, it may be set as that in response to that all of the first-stage detection values obtained within a specified time (which is greater than the second time) are less than the reference value, the processor 110 pauses playback of the image signal. Alternatively, it may be set as that when the number of times that the first-stage detection value is less than the reference value is detected to reach a specified number of times. The processor 110 pauses playback of the image signal.

During the period of pausing playback of the image signal, in step S530, the processor 110 calculates a second-stage detection value every third time. Here, the third time may be the same as or different from the second time. Namely, the processor 110 calculates an average value of a plurality of third distances received from the distance sensor 120 every third time to serve as the second-stage detection value.

For example, it is assumed that the sampling time of the distance sensor 120 is 10 ms, the third time is set to 100 ms, and the number of times for obtaining the third distance value is 10 times, during the period of pausing the image signal, the processor 110 receives 10 batches of the third distance values from the distance sensor 120 every 100 ms, and takes an average value of the 10 batches of the third distance values as the second-stage detection value. Here, the number of times for obtaining the third distance value is not limited.

In step S535, the processor 110 determines whether the second-stage detection value falls within a reference range. Here, the reference range is set based on the reference value. For example, it is assumed that the reference value is 3 meters, and the reference range is set to ±1% of 3 meters.

If the second-stage detection value is not within the reference range, step S530 is continuously executed. Namely, during the period of pausing playback of the image signal, the step S530 is continuously executed until it is determined that the obstacle between the projection apparatus 100A and the projection plane 200 leaves. In another embodiment, in order to avoid misjudgment of leaving of obstacles, as with the comparison of the first-stage detection value and the reference value as described above, the processor 110 can be further set to maintain pausing the playback of the image signal under one of the following three settings. The three settings include: the second-stage detection value is less than a setting ratio of the reference value (i.e. the reference range), all of the second-stage detection values obtained within a specified time are less than the reference value, and the number of times that the second-stage detection value is detected to be less than the reference value reaches a specified number of times.

The second-stage detection value is within the reference range. In step S540, the processor 110 continues to play the image signal. Namely, the processor 110 may cancel the pause and continue to play the image signal, and the flow returns to step S515.

In addition, the projection apparatus 100A may further include a gravity sensor (not shown), and the processor 110 may determine whether the projection apparatus 100A is moved through a sensing value of the gravity sensor. In response to determining that the projection apparatus 100A is moved, the processor 110 resets the reference value, i.e., re-receives a plurality of first distance values from the distance sensor 120 within a first time (for example, 100 ms), and calculates an average value of the first distance values for setting as the reference value.

In summary, in the above embodiments, the projection apparatus uses the distance sensor to continuously detect the distance to the projection plane, so that when an obstacle appears between the projection apparatus and the projection plane, playback of the image signal is paused, and when the obstacle moves away, the image signal is continued to be played. Accordingly, the user does not have to do anything, and has a better user experience.

The above embodiments are only preferred embodiments of the invention, and should not be used to limit the scope of implementation of the invention, i.e., simple equivalent changes and modifications made in accordance with the scope of the patent application and the description of the invention are still within the scope of the invention. Moreover, any embodiment of or the claims of the invention is unnecessary to implement all advantages or features disclosed by the invention. Moreover, the abstract and the name of the invention are only used to assist patent searching. Moreover, "first wavelength conversion area", "second wavelength conversion area", etc. mentioned in the specification and the claims are merely used to name the elements and should not be regarded as limiting the upper or lower bound of the number of the components/devices.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A control method of a projection system, comprising:
   generating an image signal and transmitting the image signal to a projection apparatus through a player apparatus;
   receiving a plurality of first distance values within a first time through a distance sensor;
   calculating an average value of the plurality of first distance values and setting the average value as a reference value through a processor;
   calculating an average value of a plurality of second distance values received from the distance sensor every second time by the processor to serve as a first-stage detection value during a playback of the image signal; and
   pausing playback of the image signal through the processor when the first-stage detection value is less than the reference value.

2. The control method of the projection system as claimed in claim 1, further comprising:
   determining whether the projection apparatus is moved through a sensing value of a gravity sensor; and
   resetting the reference value in response to determining that the projection apparatus is moved.

3. The control method of the projection system as claimed in claim 1, wherein when the first-stage detection value is less than the reference value, the step of pausing playback of the image signal through the processor comprises:
   pausing playback of the image signal through the processor when the first-stage detection value is less than a setting ratio of the reference value.

4. The control method of the projection system as claimed in claim 1, wherein when the first-stage detection value is less than the reference value, the step of pausing playback of the image signal through the processor comprises:
   pausing playback of the image signal in response to that all of the first-stage detection values obtained within a specified time are less than the reference value, wherein the specified time is greater than the second time.

5. The control method of the projection system as claimed in claim 1, wherein when the first-stage detection value is less than the reference value, the step of pausing playback of the image signal through the processor comprises:

pausing playback of the image signal when detecting that a number of times that the first-stage detection value is less than the reference value reaches a specified number of times.

6. The control method of the projection system as claimed in claim 1, further comprising:

calculating an average value of a plurality of third distances received from the distance sensor every third time to serve as a second-stage detection value when pausing playback of the image signal; and cancelling pausing and continuing to play the image signal when the second-stage detection value is within a reference range, wherein the reference range is set based on the reference value.

7. The control method of the projection system as claimed in claim 1, wherein the player apparatus is coupled to the projection apparatus, and the control method further comprises:

transmitting a pause instruction through the processor to the player apparatus; and pausing playback of the image signal through the player apparatus in response to the pause instruction.

8. A projection system, comprising:

a player apparatus, configured to generate an image signal; and a projection apparatus, coupled to the player apparatus, and configured to receive the image signal from the player apparatus, wherein the projection apparatus comprises:

a distance sensor, receiving a plurality of first distance values within a first time; and a processor, coupled to the distance sensor, and configured to calculate an average value of the plurality of first distance values for setting as a reference value, and calculate an average value of a plurality of second distances received from the distance sensor every second time to serve as a first-stage detection value during a playback of the image signal, when the first-stage detection value is less than the reference value, the processor controls the player apparatus to pause playback of the image signal.

9. The projection system as claim in claim 8, wherein the projection apparatus further comprises:

a gravity sensor, coupled to the processor, wherein the processor is configured to determine whether the projection apparatus is moved through a sensing value of the gravity sensor and to reset the reference value in response to determining that the projection apparatus is moved.

10. The projection system as claimed in claim 8, wherein the processor is configured to:

pause playback of the image signal when the first-stage detection value is less than a setting ratio of the reference value.

11. The projection system as claimed in claim 8, wherein the processor is configured to:

pause playback of the image signal in response to that all of the first-stage detection values obtained within a specified time are less than the reference value, wherein the specified time is greater than the second time.

12. The projection system as claimed in claim 8, wherein the processor is configured to:

pause playback of the image signal when detecting that a number of times that the first-stage detection value is less than the reference value reaches a specified number of times.

13. The projection system as claimed in claim 8, wherein the processor is configured to:

calculate an average value of a plurality of third distances received from the distance sensor every third time to serve as a second-stage detection value when pausing playback of the image signal; and cancel pausing and continue to play the image signal when the second-stage detection value is within a reference range, wherein the reference range is set based on the reference value.

14. The projection system as claimed in claim 8, wherein the player apparatus is coupled to the projection apparatus, the processor transmits a pause instruction to the player apparatus, and the player apparatus pauses playback of the image signal in response to the pause instruction.

* * * * *